(12) United States Patent
Dunki et al.

(10) Patent No.: US 7,818,750 B2
(45) Date of Patent: Oct. 19, 2010

(54) METHOD FOR CONTROLLING SOFTWARE MODULES

(75) Inventors: Peter Dunki, Zurich (CH); Hansbeat Loacker, Egg (CH); Markus Wietlisbach, Zollikerberg (CH)

(73) Assignee: USB AG, Zurich (CH)

( * ) Notice: Subject to any disclaimer, the term of this patent is extended or adjusted under 35 U.S.C. 154(b) by 1539 days.

(21) Appl. No.: 11/122,125

(22) Filed: May 5, 2005

(65) Prior Publication Data

US 2006/0174218 A1 Aug. 3, 2006

(30) Foreign Application Priority Data

Jan. 31, 2005 (EP) .................................. 05001942

(51) Int. Cl.
*G06F 9/46* (2006.01)
*G06F 11/00* (2006.01)
*G06Q 20/00* (2006.01)

(52) U.S. Cl. ................. 718/106; 718/100; 718/101; 705/71; 705/72; 705/75; 714/47; 714/48; 714/52; 714/100

(58) Field of Classification Search ......... 718/100–106; 705/72, 75, 1.1, 71; 714/100, 37, 47, 48, 714/52

See application file for complete search history.

(56) References Cited

U.S. PATENT DOCUMENTS

| 5,893,905 | A | 4/1999 | Main et al. |
| 6,182,071 | B1 * | 1/2001 | Fushimi ............................... 1/1 |
| 6,952,680 | B1 * | 10/2005 | Melby et al. .................. 705/28 |
| 7,054,790 | B1 * | 5/2006 | Rich ........................... 702/186 |
| 7,216,263 | B2 * | 5/2007 | Takaoka et al. ............... 714/47 |
| 2001/0049649 | A1 | 12/2001 | Baecker et al. |
| 2002/0032635 | A1 * | 3/2002 | Harris et al. ................... 705/37 |
| 2004/0236698 | A1 * | 11/2004 | Sweeney ...................... 705/64 |

(Continued)

FOREIGN PATENT DOCUMENTS

JP  11-306048  11/1999

(Continued)

OTHER PUBLICATIONS

Chinese Office Action.

(Continued)

*Primary Examiner*—Meng-Ai An
*Assistant Examiner*—Abdullah Al Kawsar
(74) *Attorney, Agent, or Firm*—Paul, Hastings, Janofsky & Walker LLP

(57) ABSTRACT

The invention relates to a method for controlling data-processing software modules (4, 5, 6, 7), wherein the data to be processed are organized in files, and wherein the processing is performed in a plurality of successive processing sections and the files in one processing section are processed by at least one software module (4, 5, 6, 7). To prevent the propagation and spreading of deviations occurring during the processing in the software modules (4, 5, 6, 7) in subsequent processing sections, information about the data processed are collected in the software modules (4, 5, 6, 7) of the processing sections and are signalized to a control system (8), said control system (8) comparing the information signalized and stopping the processing in a subsequent processing section if the comparison of the information revealed that a predetermined, admissible maximum deviation has been exceeded.

19 Claims, 2 Drawing Sheets

U.S. PATENT DOCUMENTS

2005/0004850 A1    1/2005   Gutbrod et al.
2008/0313065 A1*  12/2008   Eder ........................ 705/35

FOREIGN PATENT DOCUMENTS

WO      WO 00/36571     A1    6/2000
WO      WO 2004/063904  A2    7/2004

OTHER PUBLICATIONS

International Business Machines Corporation: "Notification thresholds in workflow management systems" Research Disclosure, Kenneth Mason Publications, Westbourne, GB, Bd. 436, Nr. 173, Aug. 2000, XP007126720—ISSN: 0374-4353.

Sinz C et al: "Detection of dynamic execution errors in IBM system automation's rule-based expert system" Information and Software Technology, Elsevier, Amsterdam, NL, Bd. 44, Nr. 14, Nov. 1, 2002, Seiten 857-873, XP004389163—ISSN: 0950-5849.

European Search Report dated Feb. 1, 2007.

International Business Machines Corporation: "Notification thresholds in workflow management systems" Research Disclosure, Kenneth Mason Publications, Westbourne, GB, Bd. 436, Nr. 173, Aug. 2000, XP007126720 ISSN: 0374-4353.

Sinz C et al: "Detection of dynamic execution errors in IBM system automation's rule-based expert system" Information and Software Technology, Elsevier, Amsterdam, NL, Bd. 44, Nr. 14, Nov. 1, 2002, Seiten 857-873, XP 004389163—ISSN: 0950-5849.

European Search Report Dated Sep. 28, 2005.

* cited by examiner

METHOD FOR CONTROLLING SOFTWARE MODULES

PRIORITY CLAIM

This application claims priority to European Patent Application No. 05001942.1, filed Jan. 31, 2005, and is incorporated herein in its entirety.

FIELD OF THE INVENTION

The invention relates to a method for controlling data processing software modules.

BACKROUND OF THE INVENTION

From prior art it is known that, at particular times of the day, a large amount of data has to be processed regularly on mainframe computer systems of large enterprises. Such data accruing regularly in large amounts will occur, for instance, when, at the end of a business day, the data of the business processes that have taken place during the day have to be processed in a so-called end of day processing.

The information accruing during the individual business processes, for instance, in the case of an industrial enterprise—who acquired something for a particular amount from whom at what time, or—in the case of a bank—who transferred a particular amount of money at a particular time or effected some other business process, is usually stored in so-called fields. All the fields containing information about a particular business process and stored in a file are usually stored in the file in a predetermined order in sequence and form a so-called data set or record.

The data sets are then collected in a file which comprises, after a certain time, the data about the business processes that have taken place since the beginning of the recording, for instance for a day or a part of a day.

The processing of such a file may, for instance, be the performance of the booking processes necessary for the business process, or the administration of a data stock, which has to be processed by a further system. Processing usually does not or not exclusively take place on the computers on which the data are created, i.e. the data are collected. Instead, the files are transferred to a central computer for processing, where the files created in many similar systems are collected and processed centrally.

Such a centralized processing involves the advantages that are usual for centralized systems. With respect to the software architecture, one has recently passed over from so-called monolithic systems, in which a large program possesses the entire functionality required for processing and thus is capable of performing all the steps of processing, to a modular software architecture, so-called distributed systems. Here, the functionality required for processing of the data is distributed to a number of smaller software modules communicating with each other. The communication of the software modules with each other can be designed such that a first software module performs a first number of working steps for every data set of an input file and generates one output data set each that is stored in an output file. This output file of the first software module serves as input file of a further software module, so that one file each is generated by one software module in a chain of such software modules and is supplied to a further one for further processing. This rudimentary kind of communication of software modules is in particular suited when, in the normal case, the processing of a large number of data sets of equal structure is performed according to a fixed scheme.

As compared to a monolithic system, such a modular system has a number of advantages. Thus, individual software modules of such a chain may simply be exchanged, the individual software modules are easier to change, and new modules may be introduced in the system or be replaced due to the distinctly defined interfaces between the modules.

Such modular systems in which a plurality of data sets accrue at a particular time in the form of such files are adapted to process the data sets within a short time. It is, in particular, often necessary to process the data sets collected in the course of a business day within a predetermined time slot so as to ensure that, for instance, particular booking processes are terminated on the same business day. An examination of the data sets for possible inconsistencies in the data sets that may be striking or may cause errors in later processing steps only cannot be performed by the first processing software module since it then would have to examine all the criteria necessary for the further processing. To this end, the entire processing would have to be reproduced in the examining software module. On the one hand, this would contradict the principle of the modular system, on the other hand, it has turned out in practice that such an examination module may also comprise errors and would have to examine an almost unmanageable amount of possible combinations of information. Also, any change of a software module would have to be entered in the examination program. A complete examination of the data sets at the beginning of the processing is thus nearly impossible. Thus, it cannot be excluded in everyday practice that inconsistencies and errors may occur during the processing of the data in the individual software modules.

Consequently, errors and inconsistencies in the data set are possibly not recognized by the first software module in the chain of processing software modules, but only by some other, later software module, so that the error may already have caused sequential errors in other, associated systems. If a software module generates a file that is subsequently processed by several software modules, or generates several files for several post-processing software modules, the error will be multiplied. The tracing and remedying of such an error must then take place at all the affected positions of the system. The earliest possible recognition and limitation of an error to a particular data set or a group of correlated data sets is thus useful, so that the processing of a data set comprising errors may be stopped as early as possible and a propagation and spreading of the error into other systems may be prevented. For the correlation between the data sets, various criteria may be utilized. Thus, for instance, all the data sets that were collected in a particular branch office or that relate to a particular kind of business process are correlated with one another.

SUMMARY OF THE INVENTION

It is thus an object of the invention to suggest a method that enables an early detection of data sets comprising errors or of inconsistent data sets, and that prevents the spreading of errors.

With a method for controlling data processing computer processes, wherein the processing takes place in a plurality of successive processing steps and wherein the data in a processing section each are processed by at least one software module, this object is solved in that, in the at least one software module of a processing section, information about the data processed is collected and signalized to a control system, and that the control system compares the information signalized by the software modules of the various processing sections and prevents the processing of the data in a subsequent processing section if the exceeding of a predetermined admissible maximum deviation has been detected.

Advantageous further developments of the invention are indicated in the sub-claims. Preferably, the software modules of a processing step collect, during the processing of the data sets, information about the data sets processed, for instance the number of the data sets processed that are correlated via a common feature. The information collected about the data sets processed is signalized by the software module belonging to a processing section to a control system as soon as it has processed all the input data sets fulfilling the correlation criterion. The control system thus obtains information about the data sets processed by the various software modules of a respective processing section. The control system then compares the information collected with respect to particular criteria in the processing software modules as to whether they concur or match with one another, or whether a predetermined admissible maximum deviation has been exceeded. If the predetermined deviation is not or just reached, the processing of the corresponding data in the software modules of the subsequent processing section is admitted, or processing in the subsequent processing section is started, respectively.

Otherwise, that is when the predefined additional maximum deviation has been exceeded, the processing of the corresponding data in the subsequent processing sections is not permitted, so that a propagation of the inconsistencies in the subsequent processing steps is prevented. The remedy of an error such that the reason for the deviations detected is searched, found and remedied, and the data or possibly also the software modules of a processing section are changed, is not or not automatically, respectively, performed by the present system or method. The system is rather designed to process the data delivered within the usually short period of time, so that inconsistencies occurring are not remedied in the software modules, but by interference of the operating personnel. The method thus only serves to detect inconsistencies between correlated data sets or errors, respectively, in the processing of the data sets in per se independent processing sections and to prevent their spreading in subsequent processing sections. Other errors that are, within a particular processing section, detected by this section itself are not subject matter of the present system and method and may possibly be corrected by the processing section itself.

The data to be processed in the processing sections may also be organized such that they are stored in several files, with the information in the files being correlated with one another. The data pertaining to one business process may thus be distributed to two or more files. In a processing section, these data may be processed by different software modules of different function. These may run simultaneously on a computer system, so that the processing of the data is also performed simultaneously. Such a distribution of the functionality of a processing section to several simultaneously running smaller software modules instead of one large program enables, according to experience, a more favorable utilization of the computer resources, so that processing may be accelerated.

The control system may advantageously be further developed in that, when the predetermined admissible maximum deviation is exceeded, an optical and/or acoustic signal that can be perceived by the operating personnel is triggered, so that the operating personnel is informed of the exceeding of the admissible maximum deviations.

Furthermore, the method can be designed such that the further processing of the data is suppressed only for that portion of the subsequent processing section in which the inconsistency ascertained would actually lead to a subsequent error. The processing of the data may, however, be released for those subsequent processing sections in which no subsequent error is effected. Thus, a release of the data may advantageously be performed for the processing in those portions of the subsequent processing sections for which the deviation ascertained is insignificant.

The method may advantageously also be further developed in that a key figure, in particular a sum, created by the bank is ascertained and signalized to the control system, and that the admissible maximum deviation is related to this key figure, in particular a sum. Such a key figure, in particular a sum, created by the bank is, for instance, the sum of all the amounts of the business processes or transactions belonging to a group of data sets. A grouping of data sets may, for instance, be performed in that the sum is created for all the data sets of a file or only for a part of the data sets, wherein, however, said data sets can be delimited against other data sets by some criterion, so that a comparison relating to a group of data sets may be performed in all the cases.

The admissible maximum deviation for such a key figure, in particular a sum, created by the bank may advantageously be determined as relative deviation. If, for instance, mathematical calculations of the key figures, in particular sums, are performed in a plurality of software modules, such as exchanges to other currencies, or other mathematical calculations, rounding differences may occur which may add up. It may, for example, be predetermined that the admissible maximum deviation of two key figures, in particular sums, created by the bank and relating to correlated data sets may have an admissible maximum deviation of 0.1% relating to one of the two values. If the ascertained deviation of the signalized values remains below this value, the deviation is classified as an almost inevitable rounding difference and is hence not classified as an error; the data may then be released for further processing in subsequent processing sections.

It may, however, also be of advantage to determine the admissible maximum deviation for a key figure, in particular a sum, created by the bank as an absolute value. Rounding differences and other errors caused by mathematical operations are, according to experience, very small. Even if the absolute sums are relatively large, such errors usually occur far behind the decimal point, so that the sum of the deviations in the sum must also be small. Thus, for instance, an amount of one Euro or one Swiss Franc or of some other currency may be determined as admissible maximum deviation.

Furthermore, the number of particular processing steps performed in the software modules may be determined as a possible control value. If, for example, a number of data sets describes a particular business process in an input file of a processing section, for instance a purchase or a rebooking, and if this file is processed by two software modules, both software modules have to signalize the same number of these business processes to the control system. If, during the comparison of the respectively signalized number of business processes, a deviation is detected, there is a grave error that may have various reasons.

In a further variant, the system may be designed such that the time consumed by a process of a started software module to the end of the process run is taken as a control value and signalized to the control system, in particular the duration between the beginning and the end of the process. The control system then compares the time measured with a predetermined experience value and reacts appropriately.

As an experience value, for instance, a statistically adjusted mean value of the process durations from one observation period, e.g. several days and/or one or several weeks, may be used. This value may automatically be determined anew periodically by the control system.

The method may also be designed such that an input file transmitted to a processing section is divided, at the beginning of the processing in this section, into several and correspondingly smaller files pursuant to predetermined criteria. Such a division lends itself if the software architecture enables the simultaneous processing of several similar files, such as it is basically possible on mainframe computer systems of prior art. A division of a large input file into several small files then permits the processing of every smaller file by a process of a software module. According to experience, it is altogether more favorable to divide a large file into smaller ones to have these then processed by several processes of the same software module. Although the operating system and thus the computer system is loaded more strongly by the administration of the larger number of processes associated therewith, this method is advantageous and quicker than the processing of a large file by one process since the several processes altogether make better use of the resources available in a mainframe computer system. Thus, the method may also be further developed such that the several files are processed simultaneously by every one process of a software module.

Furthermore, the method may also be designed such that the software modules of the processing sections are started by a permanently operating scheduler program to which an information about the success of the processing is signalized by the started processes of the software modules at the end of their run, and that the scheduler program only starts the software modules of the following processing section if the started software module signalizes the success of the processing and the exceeding of the admissible maximum deviation was not detected during the examination of the control values signalized to the control system. The scheduler program is used to start particular software modules at particular times of the day. The started software modules then process their respective data and report, at the end of their run, via a so-called return code, the success of the processing to the scheduler program. If a software module signalizes the success of the processing, the scheduler program starts the software modules of the following processing section. Otherwise, i.e. if the software module has discontinued or terminated the processing with the error status, the starting of the software modules of the following processing section is omitted. If a process of a software module is interrupted in its run due to the control values reported to the control system, this run will end in an error status. The scheduler program will then not start the software modules of the following processing section and will thus discontinue the processing of the data.

BRIEF DESCRIPTION OF THE DRAWINGS

In the following, the method according to the invention will be described by means of two Figures.

DETAILED DESCRIPTION

Figure 1:
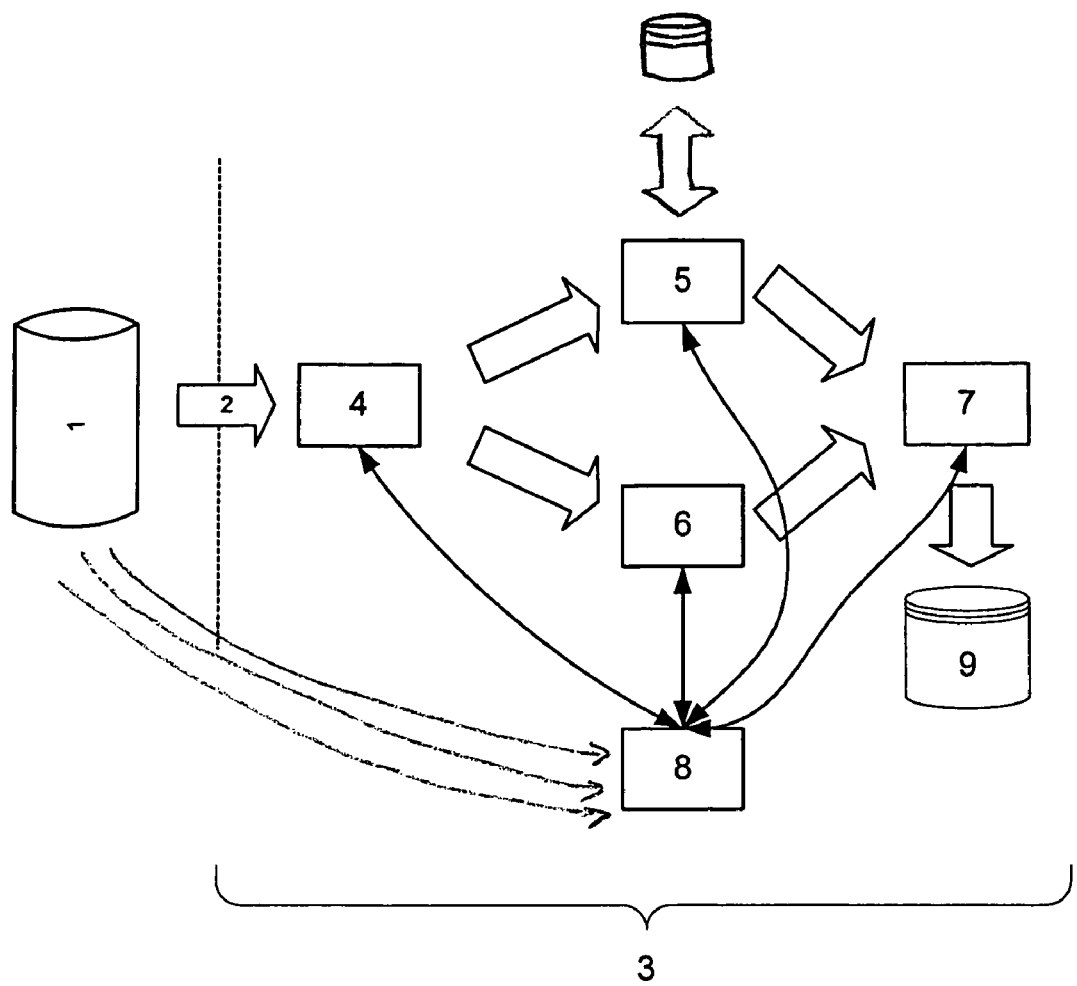
FIG. 1 shows a simplified block diagram of the control method.

The block diagram of FIG. 1 shows a system 1 that generates data or collects the data accruing with business processes in the course of a day, respectively, and supplies data to the mainframe computer system 3 via the transfer channel 2 that is illustrated schematically here. By means of a data transfer system that is secondary here, the data are supplied, in the form of files, to the system 3 that further processes the transmitted data. The processing of the data in the system 3 is performed by means of the software modules 4 to 7 which are classified into three processing sections. The software module 4 forms the first processing section and supplies data that are also available in the form of files to the software modules 5 and 6. These, in turn, process the supplied data and deliver an input file to be processed to the software module 7. The software module 7 forms the last processing section of the system 3 and finally enters the data in a database 9. The software modules 4 to 7 collect, during the processing, information about the processed data in accordance with particular criteria, for instance the number of the data sets processed, and communicate with the control system 8 such that they signalize the collected information—the control data—to the control system 8. This control system 8 does not process the (useful) data supplied by the system 1, but only the control data supplied by the software modules of the various processing sections and possibly by the system 1. In the instant example, it is assumed that each of the software modules 4 to 7 is to receive a data set for each data set supplied by the first system 1 to the second system 3, so that all software modules receive the same number of data sets. As soon as a software module has processed the respective input file, it supplies the number of the data sets processed altogether to the control system 8 which is thus reported the number of the respectively processed data sets from all software modules 4 to 7. The control system 8 compares, at the end of a processing section, the control values signalized by the software modules of this section and releases the processing of the data for the following processing section if the signalized numbers of the processed data sets concur or the admissible maximum deviation has not been exceeded, respectively. After the software modules 5 and 6 have completely processed the respective input files and have generated one file each for the further processing in the following processing section, namely by the software module 7, the software modules 5 and 6 signalize the respectively ascertained number of processed data sets to the software module 8. If the signalized values concur, the files are released for further processing by the software module 7. Otherwise, i.e. if the signalized number values deviate from one another, the processing of the data is terminated and the reason for the deviation is, for instance, ascertained by means of suitable measures and is remedied. Subsequently, the processing of the corrected data is continued. During the detecting and remedying of the deviations, the system 3 is available for the processing of other data transmitted to the system. This way, the control system 8 acts like a sluice and decides, as a function of the control values signalized, whether the data that have been processed last in a processing section have to be released for further processing in the subsequent processing section.

Figure 2:
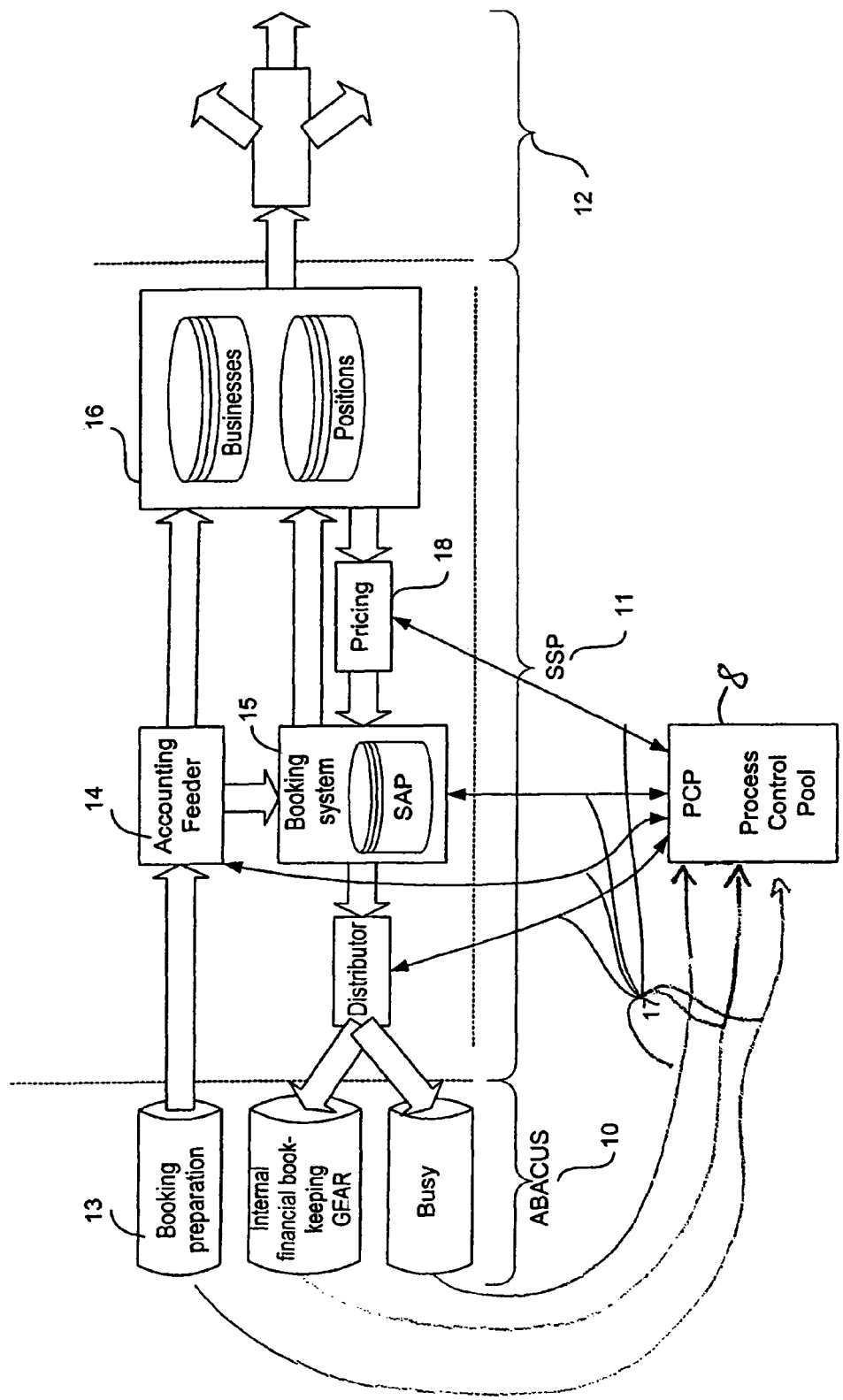
FIG. 2 shows a block diagram of such a control method by the example of a mainframe computer system of a bank.

In the following, the method will be described more concretely by means of an extract from the end of day processing of a mainframe computer system of a bank. FIG. 2 shows an association of three mainframe computer systems, the boundaries of which are indicated by dashed lines. These are the so-called ABACUS system 10, the SSP system 11 and a third system 12 that is not designated in more detail and that receives data from the SSP system 11. Furthermore, the control system PCP (Process Control Pool) 8 is illustrated which may be operated on the same mainframe computer as the SSP 11, or on an external computer. The control system PCP 8 is a software application that may run on the SSP system 11 or on an external computer system separated therefrom, and that is operated and monitored by operating personnel. The computer system comprises computer-readable storage medium (e.g. RAM, ROM, EPROM, hard disks, magnetic disks or optical disks etc.) for storing program code, software modules and data.

The flow of the data to be processed between the software modules is indicated by the bold arrows in this block diagram.

The booking preparation 13 running on the ABACUS system 10 collects the data accrued on a business day. These data are collected in files. Information concerning a business process are collected in a data set that comprises, for instance, the information about the kind of the business process, the value and the branch office at which the business process has been collected first. A file composed of such data sets may contain data sets of different branch offices which they have already transmitted to the booking preparation 13.

The booking preparation 13 transfers, in the scope of an end of day processing at 5 p.m. and 8 p.m. every day, a file to the SSP system 11 that processes the data sets further and subsequently transfers data, for instance, to the further third system 12.

The SSP system 11 comprises a plurality of software modules processing the data transferred from the ABACUS system 10 or from the booking preparation 13, respectively, in a plurality of processing sections. Each processing section consists of at least one software module that is connected with the control system PCP 8 via a signalizing connection 17. Via this signalizing connection 17, the respective software module can signalize information to the control system 8 and receive information therefrom. This communication between the control system 8 and the software modules, in which the amount of data exchanged is very small, is not performed by means of the exchange of files, but by means of operating system internal means such as so-called pipes or ports (or messages or queues, respectively) which enable a high signalizing speed and are provided by every modern operating system. The control system 8 evaluates the respective information collected by the software modules about the processing performed and reacts appropriately if the predetermined admissible maximum deviations have been exceeded, namely by stopping the further processing of the data in the processes of the software modules of the subsequent processing sections and thus preventing the spreading of errors.

On the SSP system 11, the files are processed in a first processing section by a first software module, the so-called accounting feeder 14. This accounting feeder 14 performs a format conversion due to the differing sources, so that the data are subsequently available in a uniform data format that is understandable for the subsequent programs. The accounting feeder 14 performs this format conversion once for the software module booking system 15 and once for the software module business/positions 16, so that two format conversions are performed.

During the process run of the software module 14, it collects information about the file processed. This information may be collected pursuant to different criteria. It may, for instance, be the number of all bookings, a cash total about a sum to be 15 created, which may be created depending on the currency. Likewise, the number of the different business events may be formed pursuant to the types, for instance, the number of cash bookings, the stock business processes, the mere information business processes, or the pricing business processes.

In the instant example, it is assumed in the following that the information about the data sets processed is the number of the total data sets processed and the sum of the amounts of all transfers to foreign countries. This information is signalized by the software module accounting feeder 14 to the control system PCP 8.

If the process of the software module 14 does not end its run with an error message, the processing of the file supplied to the software module businesses/positions 16 may now be performed in the next processing section. This software module enters the data in the databases and generates an output file. During its run, the software module businesses/positions 16 has determined information pursuant to the same criteria as the software module of the preceding processing section, namely the number of the total data sets processed and the sum of the amounts of all transfers to foreign countries. It signalizes this information to the control system 8. The control system 8 now compares the information signalized by the software module 14 with those signalized by the software module businesses/positions 16.

If the control system 8 detects that the information about the total data sets processed or the sums deviate from one another or that the deviation of the sum values ascertained exceeds a predetermined admissible maximum deviation, the control system 8 discontinues the further processing of the data. The files generated by the software module 14 and intended for the further processing by the software module booking system 15 and also the files generated by the software module businesses/positions and intended for the further processing by the software module pricing 18 are not released for processing. This way, the spreading of an error is prevented. The control system PCP 8 is thus in the figurative sense a central supervising means having the function of a sluice that is closed for the data on exceeding of the determined admissible maximum deviations, so that the processing chain formed by the software modules is interrupted.

In the following, it is assumed that the control system PCP 8 has not detected any inadmissible deviation and that the processing is continued.

The output file generated by the software module businesses/positions 16 is the input file of the software module pricing 18 of the next processing section. In this software module, it is determined for each data set of the input file, i.e. for each business process, which bank fees accrue therefor respectively. The software module pricing 18 generates a corresponding output file that is intended as input file for the software module booking system 15. During its run, the software module pricing 18 has also collected information about the number of the data sets processed. It signalizes this information to the control system 8 that compares this information with the information that has been signalized to the control system PCP 8 by the software modules accounting feeder 14 and businesses/positions 16 that have run previously. If no deviation is detected or if the deviation detected does not exceed the admissible maximum deviation, the further processing is not prevented.

The control system PCP 8 thus compares the control values signalized by the respective software modules after each further processing section. If the admissible maximum deviation is exceeded in such a comparison, this is recognized as an error. The further processing of the respective data is stopped and an avalanche-like spreading of the error is prevented.

The individual software modules of the processing sections are not running permanently, but are started by a so-called scheduler program, which is not shown here, only when the respective input file has been provided for processing. The scheduler program is running permanently and starts the software modules of the processing sections depending on different events. Thus, the software module accounting feeder 14 of the first processing section is, for instance, only started when the first file was transferred to the system SSP at 5 p.m. Every process of a software module or, in particular cases, the operating system of the mainframe computer, supplies an error code to the scheduler at the end of the run of the process, so that it is signalized whether the process run of the software module was successful or not. If an error code signalized to the scheduler indicates the non-planned and premature termination of a process or an error that has occurred during the processing, the scheduler does not start the software module of the next processing section since the error indicated determines prior to the start already that the following program run will not be free of errors.

A software module of a next processing section is not started by the scheduler, either, if the control system PCP 8 detects, on comparing the control values supplied, that the admissible maximum deviation has been exceeded and that the further processing thus has to be stopped. Such stopping of the processing of a file or, as the case may be, of several correlated files is performed in that the software modules of the corresponding next processing section are not started for the files concerned only. Like on every computer system capable of multitasking, of one software module that has to be available only once as an executable file, several processes processing different input files each may run simultaneously. Consequently, the processing of a particular file or of several particular files may be stopped or not be started without this affecting other processes of the same software module running at the same time, and thus without affecting the processing of other files.

What is claimed is:

1. A method for controlling data set processing software modules wherein processing of data sets is performed in a plurality of series connected and parallel connected software modules and wherein in at least a first and second parallel connected software module information about the respective number of data sets processed by the respective software module is collected, and, as soon as the respective data sets have been processed by the respective software module, is signalized to a control system, and the control system compares the numbers of data sets signalized by the first and second parallel connected software modules, respectively and stops the subsequent processing of the data sets in a software module subsequent to the first and second software modules providently if the exceeding of a predetermined admissible maximum deviation was detected between the number of data sets signalized by the first software module and the number of data sets signalized by the second software module,
wherein in the software modules of a processing section, a key figure, in particular a sum, created by a bank is determined and signalized to the control system and that the admissible maximum deviation is related to this key figure, in particular a sum.

2. The method according to claim 1, wherein the data to be processed by the software modules of a processing section are stored in a plurality of files, wherein the information of the files is correlated with one another.

3. The method according to claim 1, wherein the software modules of a processing section are running simultaneously independently of each other.

4. The method according to claim 1, wherein the control system generates an acoustic and/or optical alarm message for an operating person.

5. The method according to claim 1, wherein the processing of the data sets is permitted by the control system for a part of the subsequent processing section if the deviation detected is insignificant for this part of the subsequent processing section.

6. The method according to claim 1, wherein the admissible maximum deviation for the key figure created by the bank is determined as a relative deviation.

7. The method according to claim 1, wherein the admissible maximum deviation for the key figure created by the bank is determined as an absolute value.

8. The method according to claim 1, wherein in the software modules of the processing sections, the number of particular processing steps performed, in particular the number of data sets processed, is collected and signalized to the control system as a control value.

9. The method according to claim 1, wherein a time required by the software modules for the processing of a number of data sets, in particular a duration between the beginning and the end of the processing, is collected as a control value and is signalized to the control system.

10. The method according to claim 1, wherein the software modules of the processing sections are started by a permanently running scheduler program to which the information about the respective number of data sets that have been processed is signalized by the software modules at the end of their run, and that the scheduler program starts the software modules of the subsequent processing section only if the software modules signalizes the success of the processing and if the permissible admissible maximum deviation is not exceeded.

11. The method according to claim 1, wherein the processing of the data sets is performed in more than ten parallel processing sections.

12. The method according to claim 1, wherein the processing is performed in more than five successive, independent processing sections.

13. The method according to claim 1, wherein the data sets are stored in files, databases, or queues.

14. A computer-readable storage medium comprising a computer program comprising program code for execution on a computer for performing the method steps set forth in claim 1.

15. The computer-readable storage medium according to claim 14, wherein the computer program detects the exceeding of the predetermined admissible maximum deviation for a key figure created by a bank as an absolute value.

16. A computer system comprising a computer, a plurality of series-connected and parallel-connected software modules stored in storage medium accessible by the computer's processor(s) and data sets stored in storage medium,
wherein in at least a first and second parallel connected software module information about the respective number of data sets retrieved from the storage medium and processed by the respective software module is collected, and, as soon as the respective data sets have been processed by the respective software module, the information is signalized to a control system, and
wherein the control system compares the information about the number of data sets signalized by the first and second parallel connected software modules, respectively, and stops the subsequent processing of the data sets in a software module subsequent to the first and second software modules, if the deviation between the information about the number of data sets signalized by the first software module and the information about the number of data sets signalized by the second software module exceeds a predetermined permissible maximum deviation, wherein in the software modules of a processing section, a key figure, in particular a sum, created by a bank is determined and signalized to the control system and that the admissible maximum deviation is related to this key figure, in particular a sum.

17. The computer system of claim 16, wherein the subsequent processing of data sets by the respective software modules for a part of the subsequent processing section is permitted by the control system if the deviation detected is insignificant for this part of the subsequent processing section.

18. The computer system of claim 16, wherein the number of data sets processed is collected and signalized to the control system as a control value.

19. The computer system of claim 16, wherein the software modules are started by a permanently running scheduler program to which the information about the number of data sets that have been processed is signalized by the software modules at the end of their run, and wherein the scheduler program starts the software modules of the subsequent processing section only if the software modules signalize the success of the processing and if the permissible admissible maximum deviation is not exceeded.

* * * * *